Dec. 7, 1943.　　　　G. E. MILLER　　　　2,336,280
HOP CLUSTER STEMMER
Filed Sept. 18, 1942　　2 Sheets-Sheet 1
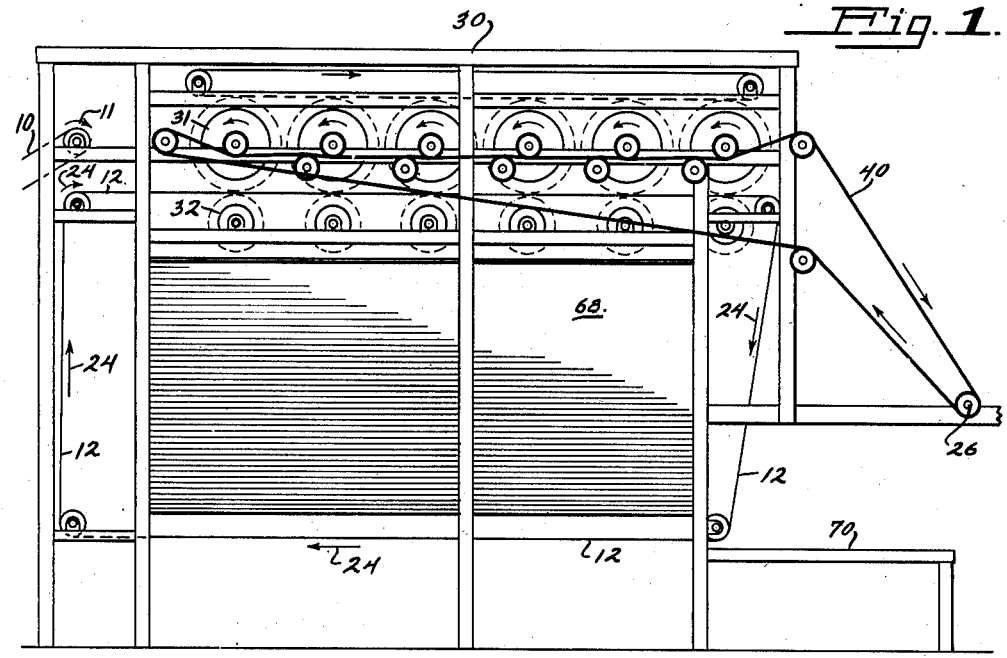
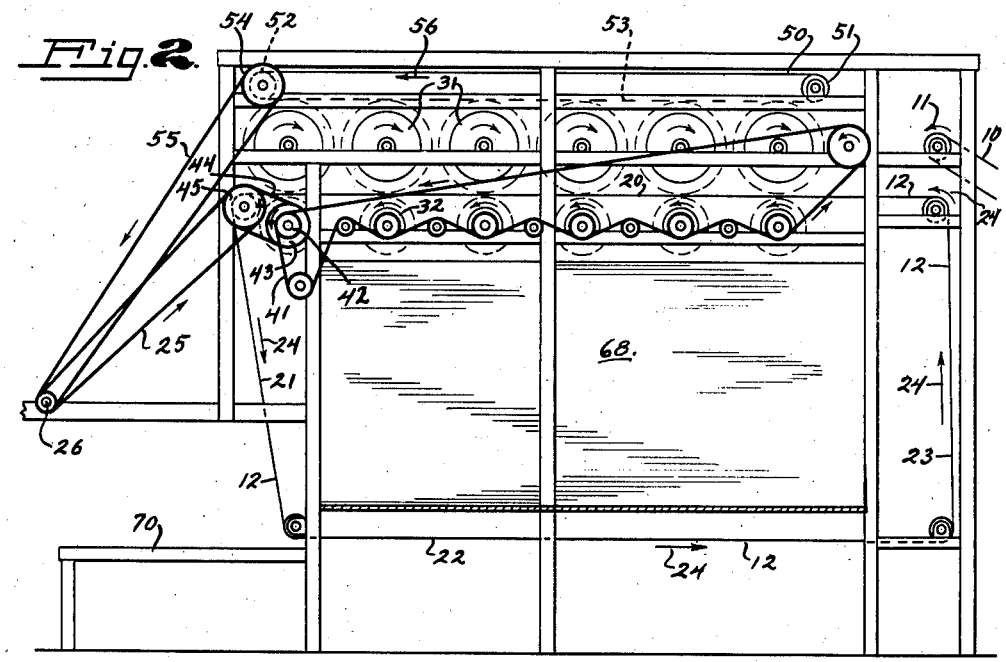
INVENTOR,
GEORGE E. MILLER.
BY
Chas. E. Townsend
ATTORNEY.

Dec. 7, 1943.   G. E. MILLER   2,336,280
HOP CLUSTER STEMMER
Filed Sept. 18, 1942   2 Sheets-Sheet 2
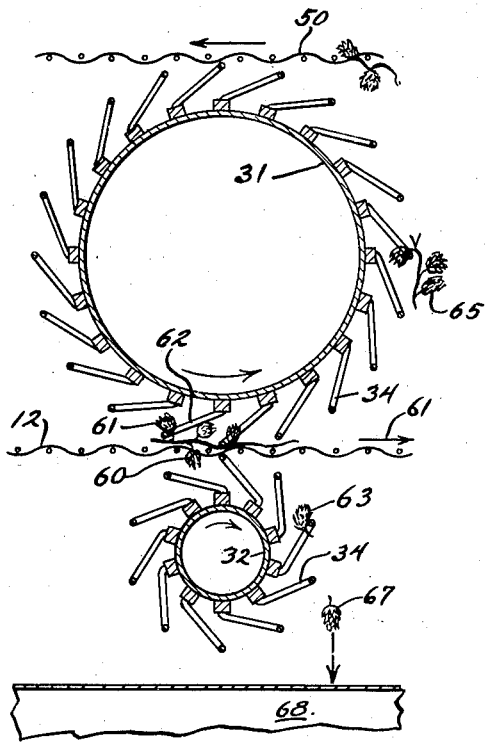
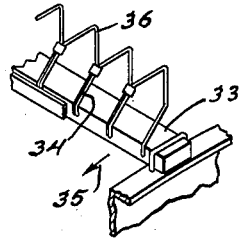
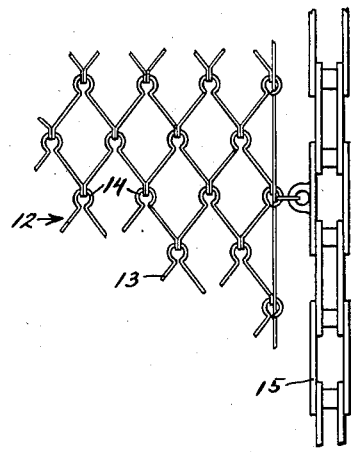
INVENTOR,
GEORGE E. MILLER.
BY
Chas. E. Townsend
ATTORNEY.

Patented Dec. 7, 1943

2,336,280

UNITED STATES PATENT OFFICE 2,336,280

HOP CLUSTER STEMMER

George E. Miller, Fair Oaks, Calif., assignor to E. Clemens Horst Company, San Francisco, Calif., a corporation of New Jersey Application September 18, 1942, Serial No. 458,793

4 Claims. (Cl. 130—30)

This invention relates to hop picking machines.

Hops grow on vines which are trained vertically on strings attached to horizontal wires suspended about eighteen feet above the ground. At harvest time the vines are pulled down and hauled to a plant where they are run through a machine which picks the hops from the vines. The picked hops are then separated from the leaves, etc.

From the time the vine is pulled down in the hop field to the time it is fed into the picking machine, it receives considerable handling in the course of which clusters become detached from the vine. A cluster comprises an arm or branch of the vine bearing a cluster of hops. Heretofore the only satisfactory way to salvage the hops on these clusters was to pick them off by hand—an expensive, laborious task.

The object of this invention is to provide a machine for doing this work.

A machine in which the invention is embodied is disclosed in the drawings in which:

Fig. 1 is a schematic side elevation of the machine.

Fig. 2 is an elevation of the opposite side of the machine.

Fig. 3 is a vertical section through a pair of finger drums.

Fig. 4 is a fragmentary perspective of a finger bar.

Fig. 5 is a fragmentary plan of a screen.

The clusters are collected and deposited on a conveyer 10 (Fig. 1) which discharges them as indicated by the arrow 11 on an endless feed belt or conveyer 12 which is constructed as shown in Fig. 5.

The central part of the conveyer on which the clusters are deposited is made of diamond mesh screen 13 hinged as indicated at 14, Fig. 5. The screen 13 is supported and carried by a pair of chains, one of which is shown at 15.

Referring to Fig. 2, the screen conveyer 12 has a horizontal upper stretch 20, a downwardly and inwardly inclined stretch 21, a horizontal lower stretch 22, and a vertical stretch 23. The conveyer is moved in the direction of the arrows 24 by a drive chain 25 which transmits power from a suitable power shaft 26.

Suitably journalled in the frame 30 are a series of upper finger drums 31 and a series of lower finger drums 32. Each drum has a plurality of transverse finger bars 33 (Fig. 4), of conventional construction. The fingers 34 are made of wire and are bent rearwardly with respect to their direction of movement indicated by the arrow 35. Adjacent fingers converge in a V, as shown at 36, in the same manner as the fingers of the human hand. In fact, when the hops are manually picked they are snared between the fingers with a raking motion of the hand. Hence the term finger.

Means are provided for rotating the finger drums. The upper drums 31 (Fig. 1) are rotated in the direction of the arrows thereon by means of a sprocket chain 40 driven from power shaft 26. The lower drums 32 are rotated in the direction of the arrows thereon (Fig. 2) by a sprocket chain 41 which engages a drive sprocket 42 which is driven in unison with a sprocket 43 by a chain 44 from a sprocket 45 which is driven by the chain 25 from the power shaft 26. The drums 31 and 32 are arranged in pairs, the axes of each pair lying in a vertical plane perpendicular to the horizontal stretch 20 of the screen conveyer 12. The upper and lower drums rotate in opposite directions and in the direction of feed of the conveyer 12.

An endless screen belt 50 (Fig. 2) having the same construction as the conveyer 12 passes around sprockets 51, 52, and has a horizontal stretch 53 above the upper drums 31. The belt 50 is driven by means of sprocket 54 and chain 55 from power shaft 26 in the direction of the arrow 56 so that the stretch 53 adjacent the drums moves in the same direction as the fingers thereon.

It is an important feature of the invention that the screens move in the same direction as the fingers adjacent thereto, and further, that the peripheral speed of the drums, or the linear speed of the fingers, exceeds the linear speed of the screens as will now be explained by reference to Fig. 3.

The clusters which may be lying in any position on the screen conveyer 12 become entangled therein as will be apparent. The cluster readily engages with the screen on account of the fact that it is in a wilted condition so that some of the hops such as shown at 60 tend to droop down through the apertures of the screen 12.

The screen 12 feeds the clusters in the direction of the arrow 61 between a pair of drums 31, 32 which are rotating in the direction of the arrow thereon. The parts are arranged as shown so that the fingers 34 pass close to the screen. The hops are picked from the cluster by the fingers. A hop, such as 61, is snared by the finger 62 in the upper drum and, because the finger is moving faster than the screen and the cluster is caught in the screen, is snapped off by the finger. A hop, such as shown at 60, which hangs down from the screen will be snared by one of the fingers in the lower drum and snapped off. A hop picked by the lower drum is shown at 63.

In the event a cluster, such as shown at 65, is pulled off the screen 12 it is thrown or carried up against the upper screen 50 where the fingers cooperate with the upper screen to perform the picking operation. Thus, it will be seen that the lower screen 12 acts as a feeding and positioning means and the upper screen performs a similar function and in addition prevents the clusters from being thrown out of the machine by the rapid rotation of the upper drums 31.

Hops picked by the upper finger drum fall down through the apertures in the screen and hops picked by the lower drum also fall downwardly therefrom. A picked hop is shown at 67. It falls down against a baffle 68. The baffle 68 (Figs. 1 and 2) extends the length of the machine and underlies the finger drums. The baffle is inclined. In Fig. 1 the under side of the baffle appears while in Fig. 2 is seen the surface of the baffle on which the hops fall. They roll down the baffle toward the reader in Fig. 2 into a conveyor (not shown) which removes them from the machine. The baffle and conveyer for collecting the picked hops may be of a construction and arrangement conventional in hop-picking machines. The arms and remaining parts of the clusters are discharged from the conveyer 12 by falling out of the conveyer in the inwardly inclined stretch 21, the material collecting on a table 70.

What I claim is:

1. A hop cluster stemmer which comprises, in combination, a horizontally disposed traveling screen for supporting and for conveying the clusters, said screen provided with diamond mesh openings, a series of picker drums disposed immediately above and adjacent to the screen, a second series of picker drums disposed immediately below and adjacent to the screen, each drum of both series carrying V-shaped picker fingers, means to revolve the drums so that the fingers sweep over the upper and lower surfaces of the screens substantially tangential thereto and in the same direction of travel of the screen, and means to rotate the drums so that the fingers travel at greater speed than the screen.

2. A hop cluster stemmer which comprises, in combination, a horizontally disposed traveling screen for supporting and for conveying the clusters, said screen provided with diamond mesh openings, a series of picker drums disposed immediately above and adjacent to the screen, a second series of picker drums disposed immediately below and adjacent to the screen, each drum of both series carrying V-shaped picker fingers, means to revolve the drums so that the fingers sweep over the upper and lower surfaces of the screens substantially tangential thereto and in the same direction of travel of the screen, means to rotate the drums so that the fingers travel at greater speed than the screen, a second mesh screen disposed immediately above and tangential to the arcs of travel of the outer ends of the fingers in the upper series of drums, and means to drive said second screen with its under stretch adjacent to the picker drums in the same direction as the adjacent fingers but at a slower rate of speed than said fingers.

3. A hop cluster stemmer comprising, in combination, two horizontally disposed, parallel spaced screen conveyers with diamond mesh openings, means to cause the lower plane of the uppermost conveyer to travel in a direction opposite to the upper plane of the lowermost conveyer and each traveling at the same speed, a series of horizontally disposed picker drums arranged between the lower plane of the upper conveyer and the upper plane of the lower conveyer, said drums having picker fingers arranged approximately tangential to the adjacent surfaces of both screens, and means to revolve the drums so that the fingers travel in the same direction as, but at greater speed than, the adjacent plane of the lower screen.

4. A hop cluster stemmer comprising, in combination, two horizontally disposed, parallel spaced screen conveyers with diamond mesh openings, means to cause the lower plane of the uppermost conveyer to travel in a direction opposite to the upper plane of the lowermost conveyer and each traveling at the same speed, a series of horizontally disposed picker drums arranged between the lower plane of the upper conveyer and the upper plane of the lower conveyer, said drums having picker fingers arranged to move in arcs approximately tangential to the adjacent surfaces of both screens, means to revolve the drums so that the fingers travel in the same direction as, but at greater speed than, the adjacent plane of the lower screen, a second series of picker drums arranged below and adjacent to the upper plane of the lowermost screen, and means to revolve that series of drums in the same direction as said screen plane and at a peripheral speed in excess of the rate of travel of the screen.

GEORGE E. MILLER.